US011073696B2

(12) United States Patent
Ide

(10) Patent No.: US 11,073,696 B2
(45) Date of Patent: Jul. 27, 2021

(54) DISPLAY DEVICE

(71) Applicant: SEIKO EPSON CORPORATION, Tokyo (JP)

(72) Inventor: Mitsutaka Ide, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 382 days.

(21) Appl. No.: 16/142,188

(22) Filed: Sep. 26, 2018

(65) Prior Publication Data

US 2019/0094546 A1 Mar. 28, 2019

(30) Foreign Application Priority Data

Sep. 27, 2017 (JP) .............................. JP2017-185858

(51) Int. Cl.
*G02B 27/01* (2006.01)
*G02B 27/42* (2006.01)

(52) U.S. Cl.
CPC ..... *G02B 27/0172* (2013.01); *G02B 27/4205* (2013.01); *G02B 2027/013* (2013.01); *G02B 2027/0145* (2013.01); *G02B 2027/0174* (2013.01); *G02B 2027/0178* (2013.01)

(58) Field of Classification Search
CPC ............ G02B 7/0172; G02B 2027/013; G02B 7/0145; G02B 7/0174; G02B 7/0178; G02B 7/4205
USPC .......................................................... 359/14
See application file for complete search history.

(56) References Cited

U.S. PATENT DOCUMENTS

| 2003/0086135 A1 | 5/2003 | Takeyama | |
|---|---|---|---|
| 2006/0132914 A1* | 6/2006 | Weiss | G02B 27/143 |
| | | | 359/462 |
| 2006/0228073 A1* | 10/2006 | Mukawa | G02B 17/0856 |
| | | | 385/31 |
| 2012/0038959 A1* | 2/2012 | Ciaudelli | G03H 1/2286 |
| | | | 359/12 |
| 2013/0222384 A1* | 8/2013 | Futterer | G02B 5/32 |
| | | | 345/426 |

(Continued)

FOREIGN PATENT DOCUMENTS

| JP | 2002-162598 A | 6/2002 |
|---|---|---|
| JP | 2002-311379 A | 10/2002 |

(Continued)

*Primary Examiner* — Collin X Beatty
(74) *Attorney, Agent, or Firm* — Oliff PLC

(57) ABSTRACT

In an optical system of a display device, a second reflection element, a first diffraction element, a first reflection element, and a second diffraction element are disposed along a traveling direction of image light emitted from an image light projecting device. A reflection surface of the first reflection element is a concave surface being a free-curved surface and being recessed in a central portion with respect to a peripheral portion, and an intermediate image is formed between the first reflection element and the second diffraction element. A reflection surface of the second reflection element is a concave surface being a free-curved surface and being recessed in a central portion with respect to a peripheral portion, and an intermediate image is formed between the second reflection element and the first diffraction element. Therefore, an intermediate lens for forming an intermediate image is not provided.

11 Claims, 12 Drawing Sheets

(56) References Cited

U.S. PATENT DOCUMENTS

| | | | |
|---|---|---|---|
| 2016/0161755 A1* | 6/2016 | Yonekubo | G02B 27/0081 |
| | | | 345/8 |
| 2016/0178909 A1* | 6/2016 | Komatsu | G02B 17/086 |
| | | | 345/8 |
| 2016/0252742 A1 | 9/2016 | Wakabayashi | |
| 2017/0059868 A1* | 3/2017 | Takeda | G02B 27/0172 |
| 2017/0184843 A1* | 6/2017 | Kuzuhara | G02B 17/0848 |
| 2017/0261751 A1* | 9/2017 | Noguchi | G02B 5/32 |
| 2018/0239141 A1* | 8/2018 | Cakmakci | G02B 27/0176 |
| 2018/0259777 A1* | 9/2018 | Uemura | G02B 17/086 |
| 2018/0275402 A1* | 9/2018 | Popovich | G02B 6/0065 |
| 2019/0369403 A1* | 12/2019 | Leister | G03H 1/268 |

FOREIGN PATENT DOCUMENTS

| | | |
|---|---|---|
| JP | 2010-033026 A | 2/2010 |
| JP | 2016-161669 A | 9/2016 |
| JP | 2017-167181 A | 9/2017 |

\* cited by examiner

EQUATION $$z = \frac{cr^2}{1+\sqrt{1-(1+k)c^2r^2}} + \sum_{j=2} C_j x^m y^n \qquad j = \frac{(m+n)^2+m+3n}{2}+1$$

- $z$     AMOUNT OF SAG OF SURFACE PARALLEL TO z-AXIS
- $c$     VERTEX CURVATURE (CUY)
- $k$     CONIC CONSTANT
- $C_j$     COEFFICIENT OF MONOMIAL $x^m y^n$

| | |
|---|---|
| y CURVATURE RADIUS | Infinity |
| NORMALIZED RADIUS | 0 |
| CONIC CONSTANT (C1) | 0 |
| x (C2) | 0 |
| y (C3) | 0 |
| x**2 (C4) | −0.0010949 |
| x * y (C5) | 0 |
| y**2 (C6) | 0.00235903 |
| x**3 (C7) | 0 |
| x**2 * y (C8) | −4.11E−05 |
| x y**2 (C9) | 0 |
| y**3 (C10) | 7.19E−06 |
| x**4 (C11) | 1.91E−06 |
| x**3 * y (C12) | 0 |
| x**2 * y**2 (C13) | −1.28E−06 |
| x * y**3 (C14) | 0 |
| y**4 (C15) | 1.04E−07 |
| x**5 (C16) | 0 |
| x**4 * y (C17) | −1.27E−07 |
| x**3 * y**2 (C18) | 0 |
| x**2 * y**3 (C19) | −5.63E−08 |
| x * y**4 (C20) | 0 |
| y**5 (C21) | 7.05E−10 |
| x**6 (C22) | 0 |
| x**5 * y (C23) | 0 |
| x**4 * y**2 (C24) | 0 |
| x**3 * y**3 (C25) | 0 |
| x**2 * y**4 (C26) | 0 |
| x * y**5 (C27) | 0 |
| y**6 (C28) | 0 |
| x**7 (C29) | 0 |
| x**6 * y (C30) | 0 |
| x**5 * y**2 (C31) | 0 |
| x**4 * y**3 (C32) | 0 |
| x**3 * y**4 (C33) | 0 |
| x**2 * y**5 (C34) | 0 |
| x * y**6 (C35) | 0 |
| y**7 (C36) | 0 |
| x**8 (C37) | 0 |
| x**7 * y (C38) | 0 |

Fig. 4

| | |
|---|---:|
| y CURVATURE RADIUS | Infinity |
| NORMALIZED RADIUS | 0 |
| CONIC CONSTANT (C1) | 0 |
| x (C2) | 0 |
| y (C3) | 0 |
| x**2 (C4) | 0.0015278 |
| x * y (C5) | 0 |
| y**2 (C6) | 0.0040399 |
| x**3 (C7) | 0 |
| x**2 * y (C8) | -9.03E-05 |
| x y**2 (C9) | 0 |
| y**3 (C10) | 0.0001977 |
| x**4 (C11) | -2.25E-07 |
| x**3 * y (C12) | 0 |
| x**2 * y**2 (C13) | -2.98E-06 |
| x * y**3 (C14) | 0 |
| y**4 (C15) | -4.47E-05 |
| x**5 (C16) | 0 |
| x**4 * y (C17) | 5.97E-09 |
| x**3 * y**2 (C18) | 0 |
| x**2 * y**3 (C19) | -1.93E-07 |
| x * y**4 (C20) | 0 |
| y**5 (C21) | -4.37E-06 |
| x**6 (C22) | 1.65E-09 |
| x**5 * y (C23) | 0 |
| x**4 * y**2 (C24) | -3.16E-10 |
| x**3 * y**3 (C25) | 0 |
| x**2 * y**4 (C26) | -2.22E-09 |
| x * y**5 (C27) | 0 |
| y**6 (C28) | 3.68E-07 |
| x**7 (C29) | 0 |
| x**6 * y (C30) | 2.26E-11 |
| x**5 * y**2 (C31) | 0 |
| x**4 * y**3 (C32) | -1.86E-10 |
| x**3 * y**4 (C33) | 0 |
| x**2 * y**5 (C34) | 2.44E-09 |
| x * y**6 (C35) | 0 |
| y**7 (C36) | 3.11E-08 |
| x**8 (C37) | 0 |
| x**7 * y (C38) | 0 |

Fig. 5

DISPLAY DEVICE

The present application is based on and claims priority from JP Application Serial Number 2017-185858, filed Sep. 27, 2017, the disclosure of which is hereby incorporated by reference herein in its entirety.

BACKGROUND

1. Technical Field

The disclosure relates to a display device that displays an image using a diffraction element.

2. Related Art

As a display device using a diffraction element such as a holographic element and the like, a display device in which a diffraction element deflects image light emitted forward from an image light projecting device toward an eye of an observer is conceivable (see JP-A-2016-161669). Interference fringes are optimized in the diffraction element to obtain an optimum diffraction angle and optimum diffraction efficiency at a specific wavelength.

In the display device described in JP-A-2016-161669, the image light has a predetermined spectral width with a specific wavelength corresponding to the interference fringes in the diffraction element as the center. Thus, light having a wavelength deviated from the specific wavelength may cause a decrease in resolution of an image.

Therefore, the inventor discussed a display device in which a first diffraction element, an intermediate lens, a reflection element, and a second diffraction element are disposed along a traveling direction of image light emitted from an image light projecting device. In the display device, the first diffraction element guides the image light emitted from the image light projecting device to the intermediate lens, and the intermediate lens forms an intermediate image. Then, the reflection element guides the intermediate image to the second diffraction element, and the second diffraction element deflects the intermediate image toward an eye of an observer. According to the configuration, the first diffraction element can perform wavelength compensation, and a decrease in resolution of an image due to the light having a wavelength deviated from a specific wavelength may be suppressed. However, the intermediate lens is used in the above-described configuration, and the number of parts may increase.

SUMMARY

The disclosure provides a display device capable of reducing the number of parts constituting an optical system.

One aspect of a display device according to the disclosure includes a first diffraction element on which image light emitted from an image light projecting device is incident, a first reflection element on which the image light emitted from the first diffraction element is incident, and a second diffraction element configured to emit the image light emitted from the first reflection element toward an eye of an observer. The first diffraction element, the first reflection element, and the second diffraction element are disposed along a traveling direction of the image light emitted from the image light projecting device. A reflection surface of the first reflection element is a concave surface with a central portion being recessed with respect to a peripheral portion. An intermediate image is formed between the first reflection element and the second diffraction element.

According to an aspect of the disclosure, the image light projected from the image light projecting device is incident on the second diffraction element via the first diffraction element, and is emitted from the second diffraction element toward the eye of the observer. Therefore, even when the image light projected from the image light projecting device includes light having a wavelength deviated from a specific wavelength corresponding to interference fringes of the second diffraction element, a deviation of diffraction angle at the second diffraction element can be compensated by the first diffraction element. Accordingly, a decrease in resolution of an image can be suppressed. The first reflection element including the reflection surface as the concave surface with the central portion being recessed with respect to the peripheral portion is disposed in an optical path from the first diffraction element to the second diffraction element, and the intermediate image is formed between the first reflection element and the second diffraction element. Therefore, an intermediate lens for forming an intermediate image does not have to be provided in the optical path from the first diffraction element to the second diffraction element, and thus the number of parts constituting the optical system can be reduced. Further, an intermediate image is not formed by an intermediate lens, and thus there is an advantage that chromatic aberration is less likely to occur.

According to an aspect of the disclosure, the reflection surface of the first reflection element may be a free-curved surface.

According to an aspect of the disclosure, the first diffraction element and the second diffraction element may each be reflection-type.

In the disclosure, the first diffraction element and the second diffraction element may each be reflection-type volume holographic elements. Therefore, a wavelength forming the image light can be selectively diffracted, and thus high transmissivity can be obtained. Therefore, external light (background) and an image can be visually recognized in the display device.

In the disclosure, an incident surface of the first diffraction element and an incident surface of the second diffraction element may each be concave surfaces with central portions being recessed with respect to peripheral portions. Therefore, the first diffraction element and the second diffraction element have a function of condensing light, and thus the function of condensing the image light toward the eye of the observer is reinforced. Therefore, a high-quality image having a great angle of view can be displayed.

According to an aspect of the disclosure, the first reflection element may have partial transmissivity. Therefore, the outside can be visually recognized via the first reflection element.

According to an aspect of the disclosure, the display device may further include a second reflection element configured to emit the image light emitted from the image light projecting device toward the first diffraction element in an optical path from the image light projecting device to the first diffraction element.

According to an aspect of the disclosure, a reflection surface of the second reflection element may be a concave surface with a central portion being recessed with respect to a peripheral portion, and an intermediate image may be formed between the second reflection element and the first diffraction element.

According to an aspect of the disclosure, the reflection surface of the second reflection element may be a free-curved surface.

According to an aspect of the disclosure, the first reflection element and the second reflection element may be formed integrally. Therefore, when the display device is assembled, the first reflection element and the second reflection element can be handled as one part.

According to an aspect of the disclosure, the display device may include a frame that holds the image light projecting device, the second reflection element, the first diffraction element, the first reflection element, and the second diffraction element. When the frame is mounted on a head of the observer, the second diffraction element may be disposed in front of the eye of the observer.

According to an aspect of the disclosure, the image light projecting device may emit the image light forward, the second reflection element may emit the image light rearward, the first diffraction element may emit the image light forward, the first reflection element may emit the image light in a right-and-left direction or downward, and the second diffraction element may emit the image light rearward. Therefore, when the image light projecting device, the second reflection element, the first diffraction element, the second reflection element, and the second diffraction element are installed on the frame mounted on the head of the observer, the image light projecting device having a relatively great mass is disposed toward the rear. Thus, the center of gravity of the display device is located toward the rear. Thus, when the display device is mounted on the head, mounting stability of the display device can be enhanced, for example, the frame is less likely to be tilted forward.

BRIEF DESCRIPTION OF THE DRAWINGS

Embodiments of the disclosure will be described with reference to the accompanying drawings, wherein like numbers reference like elements.

FIG. 4 is a schematic diagram illustrating parameters of the shape of the free-curved surface of the reflection surface of the first reflection element illustrated in FIG. 2.

FIG. 5 is a schematic diagram illustrating parameters of the shape of the free-curved surface of the reflection surface of the second reflection element illustrated in FIG. 2.

DESCRIPTION OF EXEMPLARY EMBODIMENTS

Some exemplary embodiments of the disclosure will be described below with reference to the accompanying drawings. Note that, in each of the drawings below, to make each of layers and each of members a recognizable size, each of the layers and each of the members are illustrated to be different from an actual scale and an actual angle.

Exemplary Embodiment 1

Figure 1:
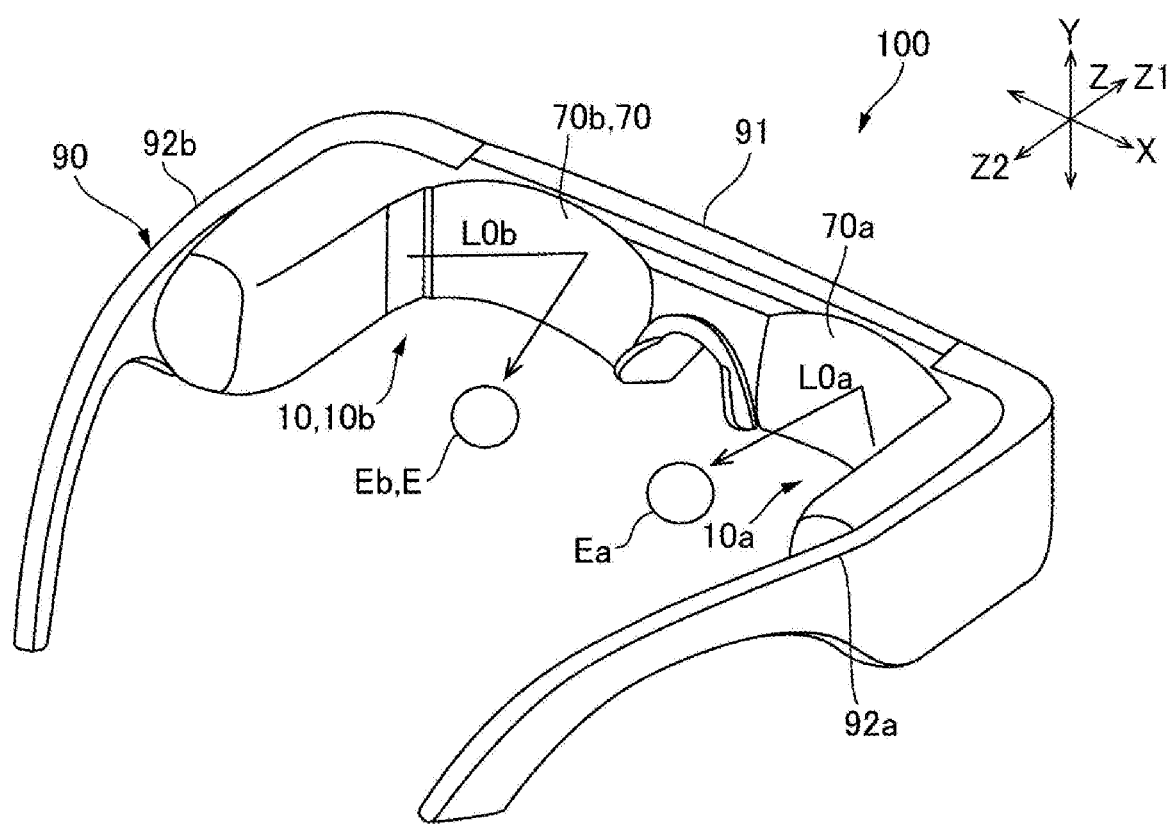
FIG. 1 is an external view illustrating one aspect of an external appearance of a display device according to Exemplary Embodiment 1 of the disclosure.
Figure 2:
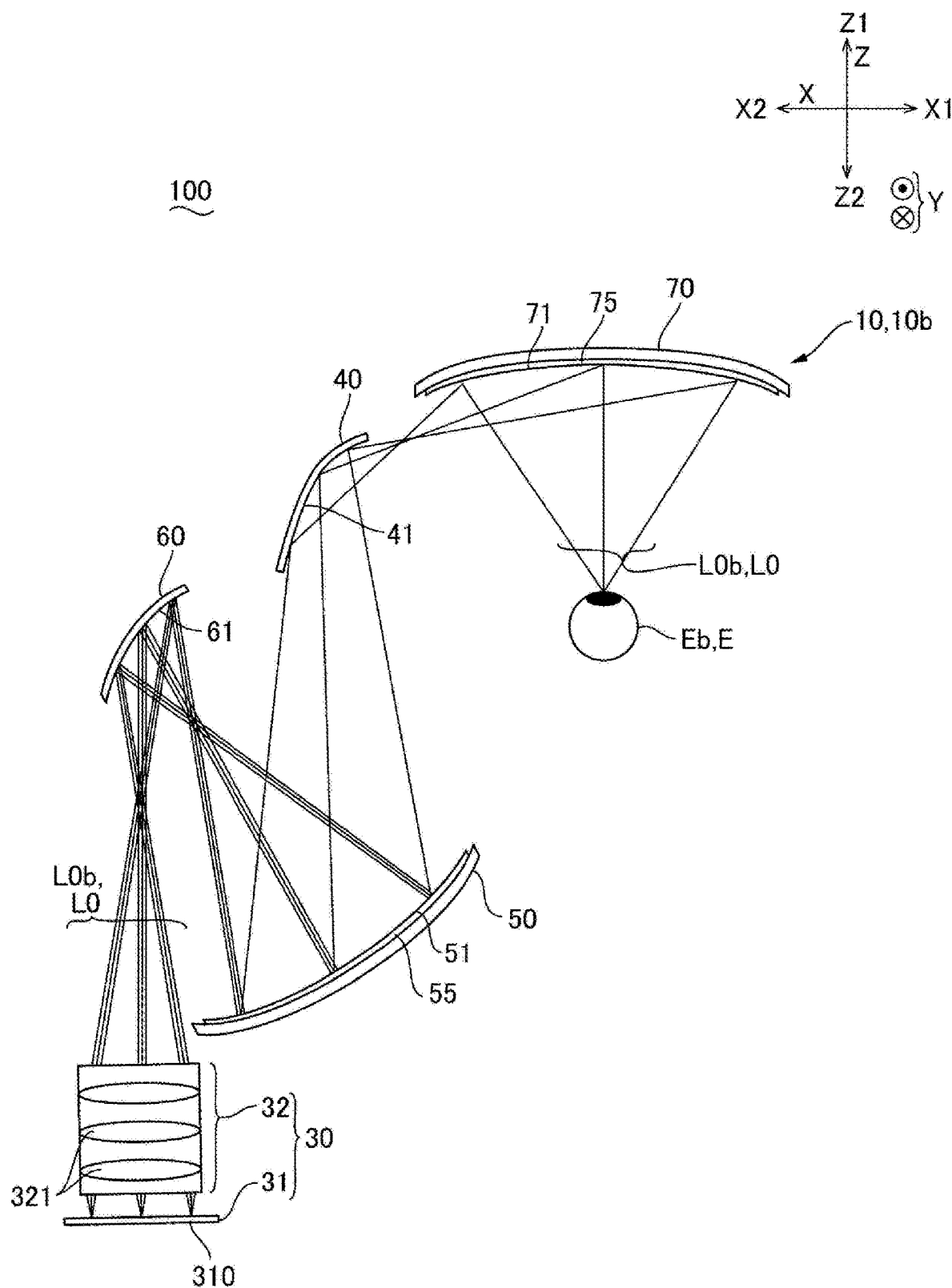
FIG. 2 is a schematic diagram illustrating one aspect of an optical system of the display device illustrated in FIG. 1.

FIG. 1 is an external view illustrating one aspect of an external appearance of a display device 100 according to Exemplary Embodiment 1 of the disclosure. FIG. 2 is a schematic diagram illustrating one aspect of an optical system 10 of the display device 100 illustrated in FIG. 1. Note that, in FIGS. 1 and 2, it is assumed as follows. A front-back direction is a first direction Z. A front side is a first side Z1 in the first direction Z. A rear side is a second side Z2 in the first direction Z. A horizontal direction is a second direction X. A vertical direction is a third direction Y. Also in FIG. 2 illustrating a left-eye optical system 10*b*, it is assumed that a right side (nose side) is a first side X1 in the second direction X, and a left side (ear side) is a second side X2 in the second direction X.

The display device 100 illustrated in FIG. 1 is a head-mounted display device, and includes a right-eye optical system 10*a* that causes image light L0*a* to be incident on a right eye Ea and a left-eye optical system 10*b* that causes image light L0*b* to be incident on a left eye Eb. For example, the display device 100 is formed in a shape like glasses. Specifically, the display device 100 includes a frame 90 that holds the right-eye optical system 10*a* and the left-eye optical system 10*b*. The frame 90 is mounted on a head of an observer. The frame 90 has a front portion 91 that holds a second diffraction element 70*a* of the right-eye optical system 10*a* and a second diffraction element 70*b* of the left-eye optical system 10*b* that are described later. A temple 92*a* on a right side of the frame 90 and a temple 92*b* on the left side respectively hold an image light projecting device of the right-eye optical system 10*a* and an image light projecting device of the left-eye optical system 10*b* that are described later.

The right-eye optical system 10*a* and the left-eye optical system 10*b* have the same basic configuration. Therefore, the right-eye optical system 10*a* and the left-eye optical system 10*b* will be described as the optical system 10 without distinction in the description below. FIG. 2 illustrates only the left-eye optical system 10*b* as the optical system 10, and description of the right-eye optical system 10*a* will be omitted. FIG. 2 also includes beams of light at an angle of view at a center and both ends of image light. However, only a central beam of light at each angle of view of beams of light after a first diffraction element 30 is illustrated while the other beams of light are omitted to simplify the drawing.

As illustrated in FIG. 2, the first diffraction element 50 on which image light L0 emitted from an image light projecting device 30 is incident, a first reflection element 40 on which the image light L0 emitted from the first diffraction element 50 is incident, and a second diffraction element 70 that emits the image light L0 emitted from the first reflection element 40 toward an eye E of an observer are disposed along a traveling direction of the image light L0 emitted from the image light projecting device 30 in the optical system 10. A second reflection element 60 that emits, toward the first diffraction element 50, the image light L0 emitted from the image light projecting device 30 is provided in an optical path from the image light projecting device 30 to the first diffraction element 50. In the optical system 10, with reference to the traveling direction of the image light L0 in the first direction Z (front-back direction), the image light projecting device 30 emits the image light L0 toward the first side Z1 (front) in the first direction Z. The image light L0 emitted from the image light projecting device 30 is incident on the second reflection element 60 from the second side Z2 in the first direction Z. The second reflection element 60 emits the incident image light L0 toward the second side Z2 (rear) in the first direction Z. The image light L0 emitted from the second reflection element 60 is incident on the first diffraction element 50 from the first side Z1 in the first direction Z. The first diffraction element 50 emits the incident image light L0 toward the first side Z1 in the first direction Z. The image light L0 emitted from the first diffraction element 50 is incident on the first reflection element 40 from the second side Z2 in the first direction Z. The first reflection element 40 emits the incident image light L0 toward the first side X2 in the second direction X (right-and-left direction). The image light L0 emitted from the first diffraction element 50 is incident on the second diffraction element 70 from the second side X2 in the second direction X. The second diffraction element 70 emits the incident image light L0 toward the second side Z2 in the first direction Z. The image light L0 emitted from the second diffraction element 70 is incident on the eye E of the observer.

Detailed Configuration of Optical System 10

In Exemplary Embodiment 1, the image light projecting device 30 includes an image light generating device 31 that generates the image light L0 and a projection optical system 32 that projects the image light L0 generated by the image light generating device 31. In Exemplary Embodiment 1, the image light generating device 31 and the projection optical system 32 each emit the image light L0 toward the first side Z1 in the first direction Z.

The projection optical system 32 includes a plurality of lenses 321. An aspect may be adopted where the image light generating device 31 includes a display panel 310 such as an organic electroluminescent display element. The aspect can provide a small-sized display device 100 capable of displaying a high-quality image. Another aspect may be adopted where the image light generating device 31 includes an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the image light L0. Herein, an aspect may be adopted where the image light generating device 31 includes one display panel 310 that enables color display. Another aspect may be adopted where the image light generating device 31 includes a plurality of display panels 310 corresponding to respective colors and a synthesis optical system that synthesizes image light in respective colors emitted from the plurality of display panels 310. Furthermore, an aspect may be adopted where the image light projecting device 30 modulates laser light by a micromirror device.

The second reflection element 60 is disposed such that a reflection surface 61 is oriented in a direction inclined obliquely from the second side Z2 in the first direction Z to the first side X1 in the second direction X, and emits the image light L0 projected from the image light projecting device 30 in the direction inclined obliquely from the second side Z2 in the first direction Z to the first side X1 in the second direction X.

Herein, the reflection surface 61 is a concave surface with a central portion being recessed with respect to a peripheral portion, and an intermediate image is formed between the second reflection element 60 and the first diffraction element 50. In Exemplary Embodiment 1, the reflection surface 61 is a free-curved surface described later with reference to FIGS. 3 and 5.

The first diffraction element 50 is a reflection-type diffraction element, and emits the image light L0 emitted from the second reflection element 60 toward the first side Z1 in the first direction Z. In Exemplary Embodiment 1, the first diffraction element 50 is disposed at the second side Z2 in the first direction Z in a position away from the second reflection element 60 such that an incident surface 51 faces in a direction inclined obliquely from the first side Z1 in the first direction Z to the second side X2 in the second direction X. Therefore, the first diffraction element 50 emits, toward the first side Z1 in the first direction Z, the image light L0 incident in the direction inclined obliquely from the first side Z1 in the first direction Z to the second side X2 in the second direction X.

The first reflection element 40 is disposed such that a reflection surface 41 faces in the direction inclined obliquely from the second side Z2 in the first direction Z to the first side X1 in the second direction X, and emits the image light L0 projected from the first diffraction element 50 to the direction inclined obliquely from the first side Z1 in the first direction Z to the first side X1 in the second direction X.

Herein, the reflection surface 41 is a concave surface with a central portion being recessed with respect to a peripheral portion, and an intermediate image is formed between the first reflection element 40 and the second diffraction element 70. In Exemplary Embodiment 1, the reflection surface 41 is a free-curved surface described later with reference to FIGS. 3 and 4.

The second diffraction element 70 is disposed in a position deviated from a position on the first side Z1 in the first direction Z opposed to the first reflection element 40 toward the first side X1 in the second direction X such that an incident surface 71 faces the second side Z2 in the first direction Z.

Configuration of Reflection Surfaces 41 and 61

Figure 3:
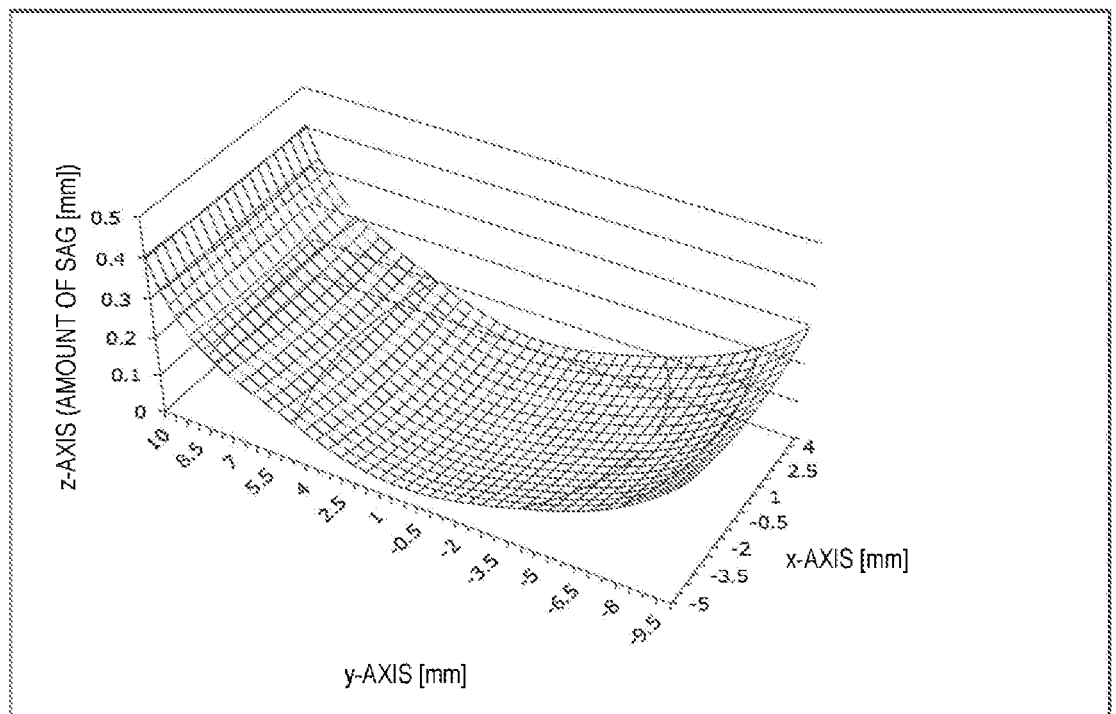
FIG. 3 is a schematic diagram illustrating a shape of a free-curved surface of reflection surfaces of a first reflection element and a second reflection element illustrated in FIG. 2.

FIG. 3 is a schematic diagram illustrating a shape of a free-curved surface of the reflection surfaces 41 and 61 of the first reflection element 40 and the second reflection element 60, respectively, illustrated in FIG. 2. FIG. 4 is a schematic diagram illustrating parameters of the shape of the free-curved surface of the reflection surface 41 of the first reflection element 40 illustrated in FIG. 2. FIG. 5 is a schematic diagram illustrating parameters of the shape of the free-curved surface of the reflection surface 61 of the second reflection element 60 illustrated in FIG. 2. Note that a coordinate system illustrated in FIG. 3 is represented in xyz coordinates using lower-case letters xyz because the coordinate system is different from the XYZ coordinate system illustrated in FIGS. 1 and 2. FIGS. 4 and 5 illustrate only a part of parameters, and a value of a parameter omitted from FIGS. 4 and 5 is zero. In FIG. 3, z represents the amount of sag. In FIGS. 4 and 5, x and y represent two directions orthogonal to each other in in-plane directions of the reflection surfaces 41 and 61.

The reflection surfaces 41 and 61 of the first reflection element 40 and the second reflection element 60, respectively, illustrated in FIG. 2 are formed as a free-curved surface illustrated in FIG. 3, and a shape of the free-curved surface is defined by an equation illustrated in FIG. 3. Herein, each of the parameters of the reflection surface 41 of the first reflection element 40 is as illustrated in FIG. 4. Each of the parameters of the reflection surface 61 of the second reflection element 60 is as illustrated in FIG. 5.

Detailed Configuration of First Diffraction Element 50 and Second Diffraction Element 70

Figure 6:
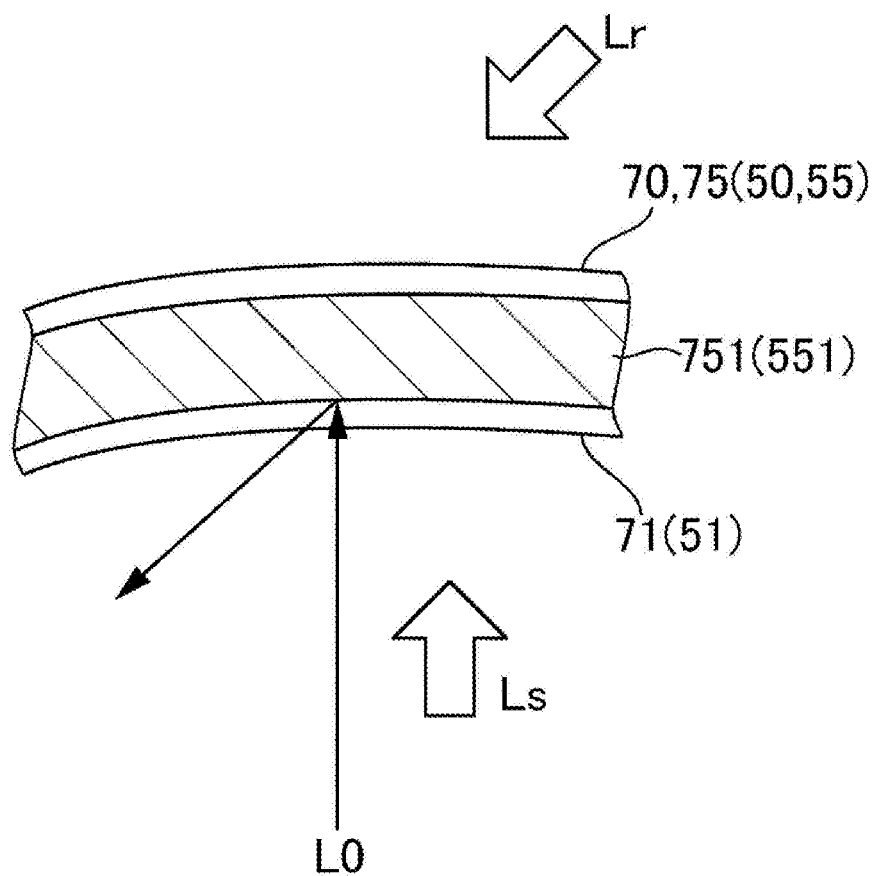
FIG. 6 is a schematic diagram of interference fringes of a second diffraction element illustrated in FIG. 2.

FIG. 6 is a schematic diagram of interference fringes 751 of the second diffraction element 70 illustrated in FIG. 2. In FIG. 2, the second diffraction element 70 includes a reflection-type volume holographic element 75 that is a partial reflection-type diffraction optical element. Thus, the second diffraction element 70 forms a partial transmissive reflective combiner. Therefore, external light is also incident on the eye E via the second diffraction element 70, and thus the observer can recognize an image in which the image light L0 formed by the image light generating device 31 and the external light (background) are superimposed on each other.

The second diffraction element 70 faces the eye E of the observer. The incident surface 71 of the second diffraction element 70 on which the image light L0 is incident has a concave surface being recessed in a direction away from the eye E. In other words, the incident surface 71 has a shape having a central portion recessed and curved with respect to a peripheral portion in the incident direction of the image light L0. Thus, the image light L0 can be efficiently condensed toward the eye E of the observer.

The first diffraction element 50 includes a reflection-type volume holographic element 55 that is a partial reflection-type diffraction optical element. The incident surface 51 of the first diffraction element 50 on which the image light L0 is incident has a concave surface being recessed. In other words, the incident surface 51 has a shape having a central portion recessed and curved with respect to a peripheral portion in the incident direction of the image light L0. Thus, the image light L0 can be efficiently deflected toward the first reflection element 40.

As illustrated in FIG. 6, the second diffraction element 70 includes the interference fringes 751 having a pitch corresponding to a specific wavelength. The interference fringes 751 are recorded as a difference in refractive index and the like in a hologram photosensitive layer. The interference fringes 751 are inclined in one direction with respect to the incident surface 71 of the second diffraction element 70 so as to correspond to a specific incident angle. Therefore, the second diffraction element 70 diffracts and then deflects the image light L0 in a predetermined direction. The specific wavelength and the specific incident angle respectively correspond to a wavelength and an incident angle of the image light L0. The interference fringes 751 having the configuration can be formed by performing interference exposure on the holographic photosensitive layer by using reference light Lr and object light Ls.

Note that the first diffraction element 50 and the second diffraction element 70 have the same basic configuration. Therefore, interference fringes 551 of the first diffraction element 50 are illustrated in FIG. 6, and description of the first diffraction element 50 will be omitted.

Wavelength Compensation

Figure 7:
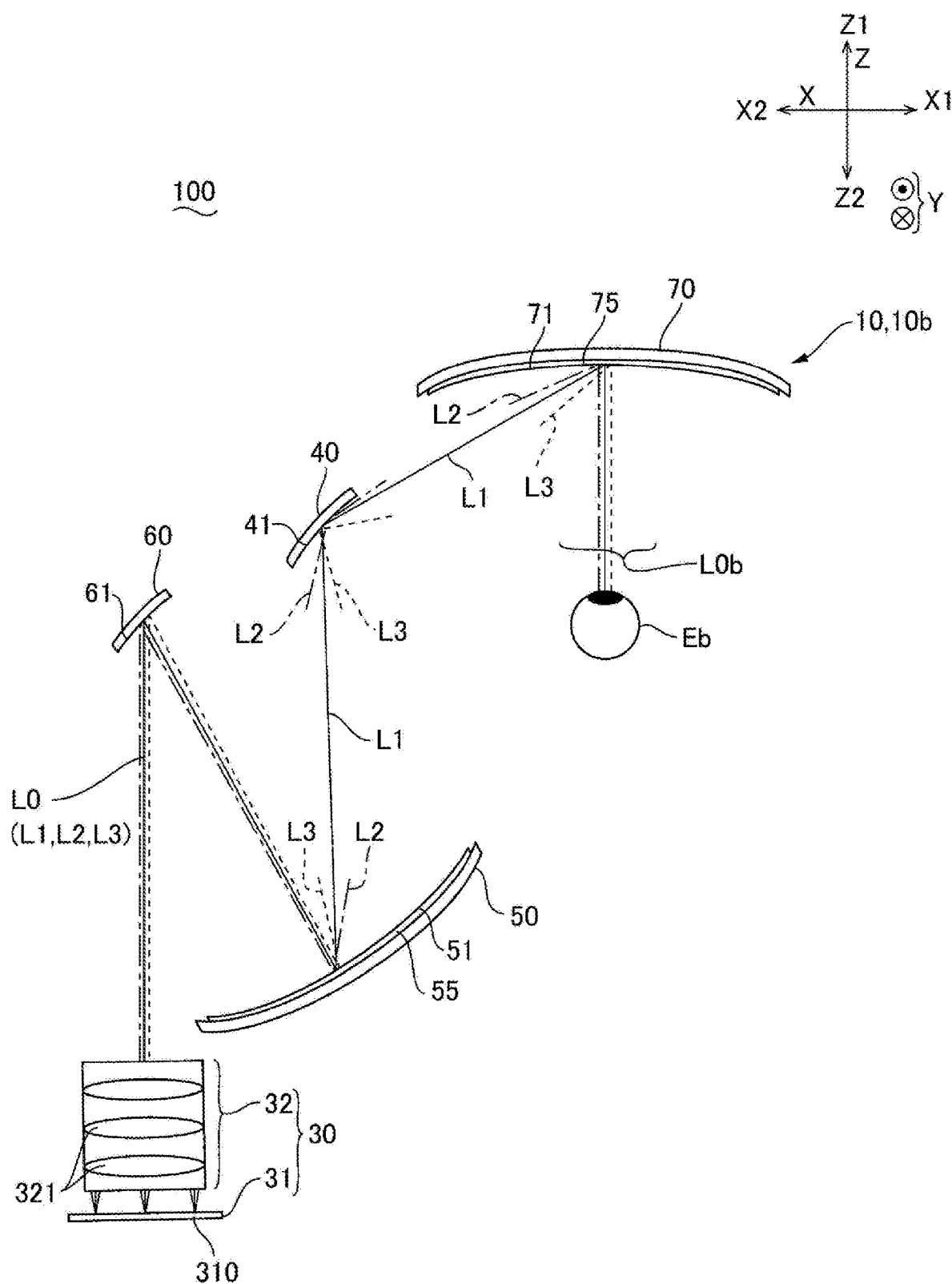
FIG. 7 is a schematic diagram of wavelength compensation at a first diffraction element and the second diffraction element illustrated in FIG. 2.

FIG. 7 is a schematic diagram of wavelength compensation in the first diffraction element 50 and the second diffraction element 70 illustrated in FIG. 2. Note that FIG. 7 illustrates only wavelength compensation in the beam of light at the center of the angle of view, but the same wavelength compensation is also performed on the other beams of light at the angle of view. FIG. 7 illustrates light L1 (solid line) having the specific wavelength of the image light L0. For example, it is assumed that the light L1 is light having a wavelength at an intensity peak of the image light L0. FIG. 7 also illustrates light L2 (dot-and-dash line) on a long wavelength side with respect to the specific wavelength and light L3 (dotted line) on a short wavelength side with respect to the specific wavelength. Only the beam of the light L1 having the specific wavelength is illustrated between the first diffraction element 50 and the second diffraction element 70 to simplify the drawing.

In FIG. 7, the image light L0 incident on the first diffraction element 50 is diffracted and deflected by the first diffraction element 50. At this time, the light L2 on the long wavelength side with respect to the specific wavelength has a diffraction angle greater than a diffraction angle of the light L1 having the specific wavelength. Further, the light L3 on the short wavelength side with respect to the specific wavelength has a diffraction angle smaller than a diffraction angle of the light L1 having the specific wavelength. Therefore, the image light L0 emitted from the first diffraction element 50 is deflected and dispersed at each wavelength.

The image light L0 emitted from the first diffraction element 50 is incident on the second diffraction element 70 via the first reflection element 40 and is then diffracted and deflected by the second diffraction element 70. At this time, in the optical path from the first diffraction element 50 to the second diffraction element 70, the first reflection element 40 reflects the image light L0 once and forms an intermediate image once. Therefore, when assuming that an angle between the image light L0 and a normal line of the incident surface of the second diffraction element 70 is an incident angle, the light L2 on the long wavelength side with respect to the specific wavelength has an incident angle greater than an incident angle of the light L1 having the specific wavelength while the light L3 on the short wavelength side with respect to the specific wavelength has an incident angle smaller than the incident angle of the light L1 having the specific wavelength. Further, the light L2 on the long wavelength side with respect to the specific wavelength has a diffraction angle greater than a diffraction angle of the light L1 having the specific wavelength. Further, the light L3 on the short wavelength side with respect to the specific wavelength has a diffraction angle smaller than a diffraction angle of the light L1 having the specific wavelength.

Therefore, the light L2 on the long wavelength side with respect to the specific wavelength is emitted from the first diffraction element 51 at an emission angle greater than an emission angle of the light L1 having the specific wavelength. However, the light L2 on the long wavelength side with respect to the specific wavelength has the diffraction angle greater than the diffraction angle of the light L1 having the specific wavelength. Thus, as a result, the light L2 on the long wavelength side with respect to the specific wavelength and the light L1 having the specific wavelength are substantially parallel light when being emitted from the second diffraction element 70. In contrast, the light L3 on the short wavelength side with respect to the specific wavelength is emitted from the first diffraction element 51 at an emission angle smaller than an emission angle of the light L1 having the specific wavelength. However, the light L3 on the short wavelength side with respect to the specific wavelength has the diffraction angle smaller than the diffraction angle of the light L1 having the specific wavelength. Thus, as a result, the light L3 on the short wavelength side with respect to the specific wavelength and the light L1 having the specific wavelength are substantially parallel when being emitted from the second diffraction element 70. Accordingly, since the image light L0 emitted from the second diffraction element 70 is incident as the substantially parallel light on the eye E of the observer, misalignment of image formation in a retina at each wavelength can be suppressed.

Herein, the first diffraction element 50 and the second diffraction element 70 may be formed to cancel out a deviation of diffraction angle due to wavelengths. For example, a deviation of diffraction angle due to wavelengths can be canceled out by forming the first diffraction element 50 and the second diffraction element 70 such that the interference fringes 551 and 751 illustrated in FIG. 6 are equal in pitch and inclination in an in-plane direction. However, an aspect may be adopted where the interference fringes 551 and 751 are different in pitch and inclination in the in-plane direction in consideration of an influence of an optical part disposed between the first diffraction element 50 and the second diffraction element 70. In this case, the interference fringes 551 and 751 may have different pitches or inclinations in consideration of the influence of the optical part in order to condense the image light L0 emitted from the second diffraction element 70. In either case, the image light L0 to be incident on the first diffraction element 50 is adjusted, when passing through the projection optical system 32, to be a beam in a parallel state having an angle according to a position where the light was generated. Thus, the interference fringes 551 can have a pitch and an inclination such that the first diffraction element 50 and the second diffraction element 70 cancel out a deviation of diffraction angle due to wavelengths according to a position in the in-plane direction of the first diffraction element 50.

Specific Example of Configuration of First Diffraction Element 50 and Second Diffraction Element 70

Figure 8:
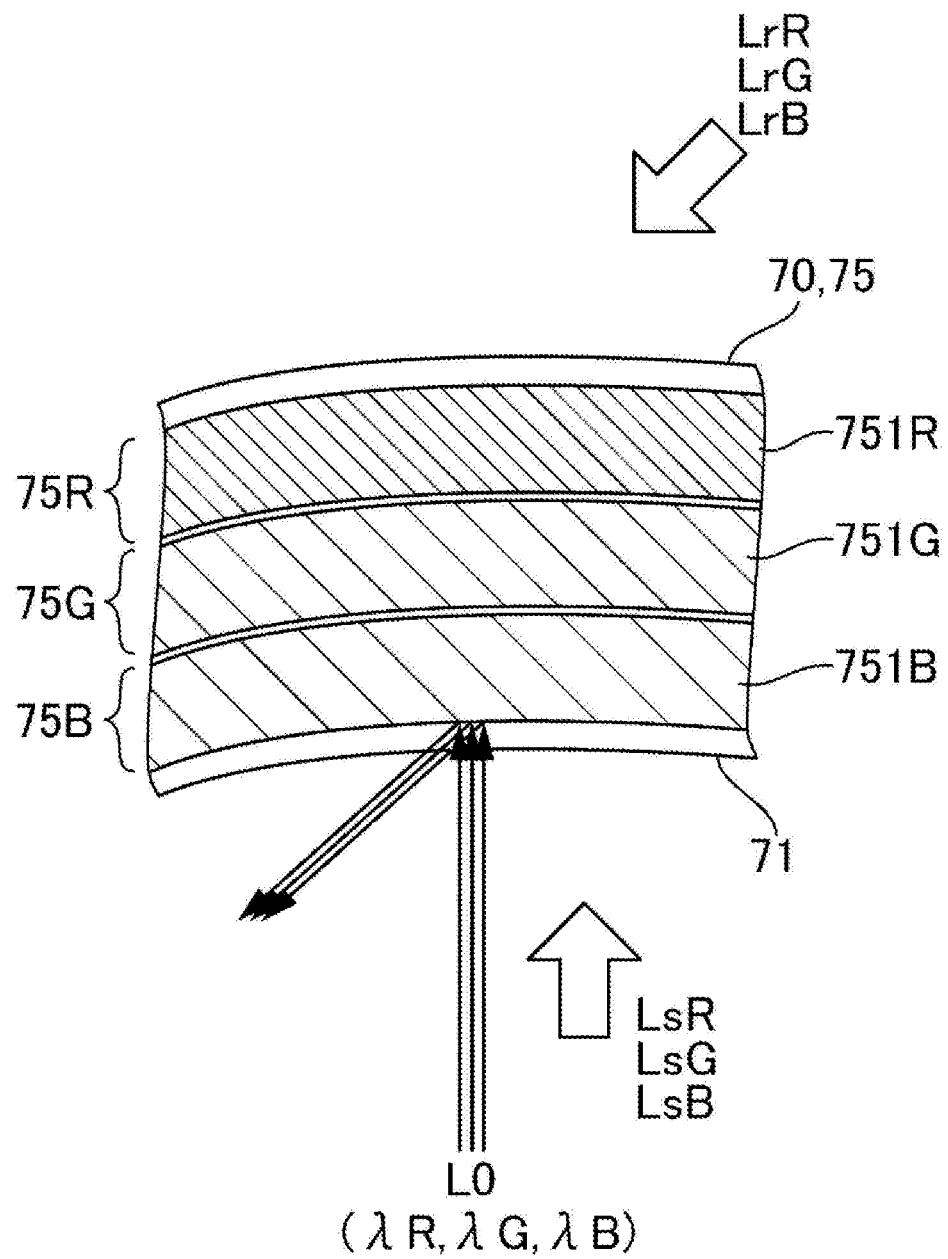
FIG. 8 is a cross-sectional diagram illustrating Specific Example 1 of a configuration of the second diffraction element illustrated in FIG. 2.
Figure 9:
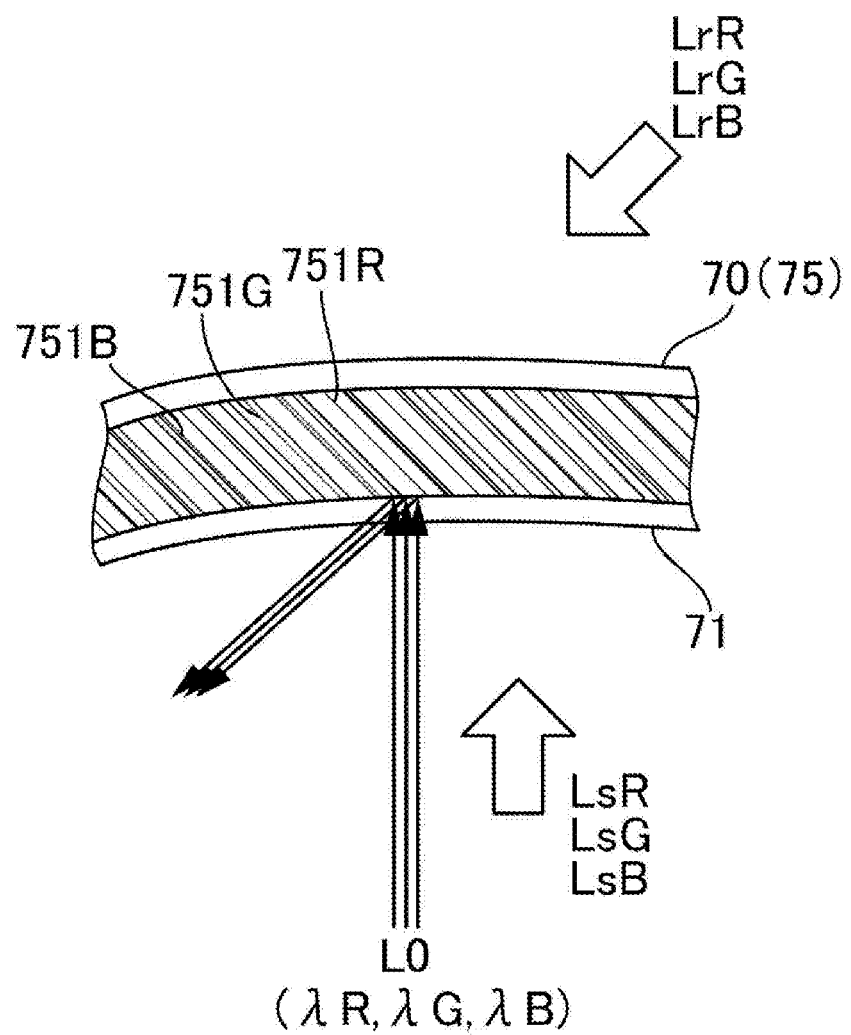
FIG. 9 is a cross-sectional diagram illustrating Specific Example 2 of a configuration of the second diffraction element illustrated in FIG. 2.

FIG. 8 is a cross-sectional diagram illustrating Specific Example 1 of a configuration of the second diffraction element 70 illustrated in FIG. 2. FIG. 9 is a cross-sectional diagram illustrating Specific Example 2 of a configuration of the second diffraction element 70 illustrated in FIG. 2. When the image light L0 is used for color display in the display device illustrated in FIGS. 1 and 2, the first diffraction element 50 and the second diffraction element 70 are formed as illustrated in FIG. 8 or 9. Note that FIGS. 8 and 9 illustrate only the second diffraction element 70, and the first diffraction element 50 is omitted from the diagrams.

In the example of the configuration illustrated in FIG. 8, in the second diffraction element 70, reflection-type volume holographic elements 75R, 75G, and 75B are laminated, and interference fringes 751R, 751G, and 751B are respectively formed in the reflection-type volume holographic elements 75R, 75G, and 75B at a pitch corresponding to a specific wavelength. For example, the interference fringes 751R are formed at a pitch corresponding to a wavelength in a range from 580 nm to 700 nm, for example, a wavelength of 615 nm. The interference fringes 751G are formed at a pitch corresponding to a wavelength in a range from 500 nm to 580 nm, for example, a wavelength of 535 nm. The interference fringes 751B are formed at a pitch corresponding to a wavelength in a range from 400 nm to 500 nm, for example, a wavelength of 460 nm. The configuration can be formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Further, as illustrated in FIG. 9, the interference fringes 751R, 751G, and 751B may be formed in one layer by dispersing a photosensitive material having sensitivity corresponding to the respective wavelengths in the holographic photosensitive layer and then performing interference exposure on the holographic photosensitive layer by using the reference light LrR, LrG, and LrB and the object light LsR, LsG, and LsB having the respective wavelengths.

In the both examples of the configuration illustrated in FIGS. 8 and 9, light having a spherical wave may be used as the reference light LrR, LrG, and LrB and the object light LsR, LsG, and LsB.

Advantage of Exemplary Embodiment 1

As described above, in the display device 100 in Exemplary Embodiment 1, the image light L0 projected from the image light projecting device 30 is emitted from the second reflection element 60 toward the second side Z2 (rear side) in the first direction Z, and is then incident on the first diffraction element 50. The image light L0 is emitted from the first diffraction element 50 toward the first side Z1 (front side) in the first direction Z, and is then incident on the second diffraction element 70 via the second reflection element 60. Therefore, even when the image light L0 projected from the image light projecting device 30 includes light having a wavelength deviated from the specific wavelength corresponding to the interference fringes of the second diffraction element 70, a deviation of diffraction angle at the second diffraction element 70 can be compensated by the first diffraction element 50. Accordingly, a decrease in resolution of an image can be suppressed.

The first reflection element 40 including the reflection surface 41 as the concave surface being recessed in the central portion with respect to the peripheral portion is disposed in the optical path from the first diffraction element 50 to the second diffraction element 70. Thus, an intermediate image can be formed between the first reflection element 40 and the second diffraction element 70. Therefore, an intermediate lens for forming an intermediate image does not have to be provided in the optical path from the first diffraction element 50 to the second diffraction element 70, and thus the number of parts constituting the optical system 10 can be reduced. Accordingly, a weight of the display device 100 can be reduced. Thus, when the display device 100 is formed as a head-mounted display device, the display device 100 can be more comfortable to wear. Further, an intermediate image is not formed by an intermediate lens, and thus there is an advantage that chromatic aberration is less likely to occur.

The second reflection element 60 including the reflection surface 61 as the concave surface being recessed in the central portion with respect to the peripheral portion is disposed in the optical path from the image light projecting device 30 to the first diffraction element 50. Thus, an intermediate image can be formed between the second reflection element 60 and the first diffraction element 50.

The second reflection element 60 is disposed on the first side Z1 in the first direction Z with respect to the image light projecting device 30, and thus the image light projecting device 30 having a great mass can be disposed on the second side Z2 in the first direction Z. In Exemplary Embodiment 1, the image light projecting device 30 is located on the second side Z2 in the first direction Z with respect to the first diffraction element 50. Accordingly, when the image light projecting device 30, the second reflection element 60, the first diffraction element 50, the first reflection element 40, and the second diffraction element 70 are installed on the frame 90 mounted on the head of the observer, the image light projecting device 30 having a relatively great mass is disposed on the second side Z2 in the first direction Z (toward the rear side, that is, a position away from the second diffraction element 70 that deflects the image light L0 toward the eye E of the observer to an observer side). Thus, the center of gravity of the display device 100 is located toward the rear side. Thus, when the display device 100 is mounted on the head, mounting stability of the display device 100 can be enhanced, for example, the frame 90 is less likely to be tilted forward.

The image light projecting device 30 projects the image light L0 toward the first side Z1 in the first direction Z. Thus, the image light L0 projected from the image light projecting device 30 can be projected to the front and incident on the second reflection element 60 without a reflection member located closer to the second side Z2 in the first direction Z than the image light projecting device 30.

Exemplary Embodiment 2

Figure 10:
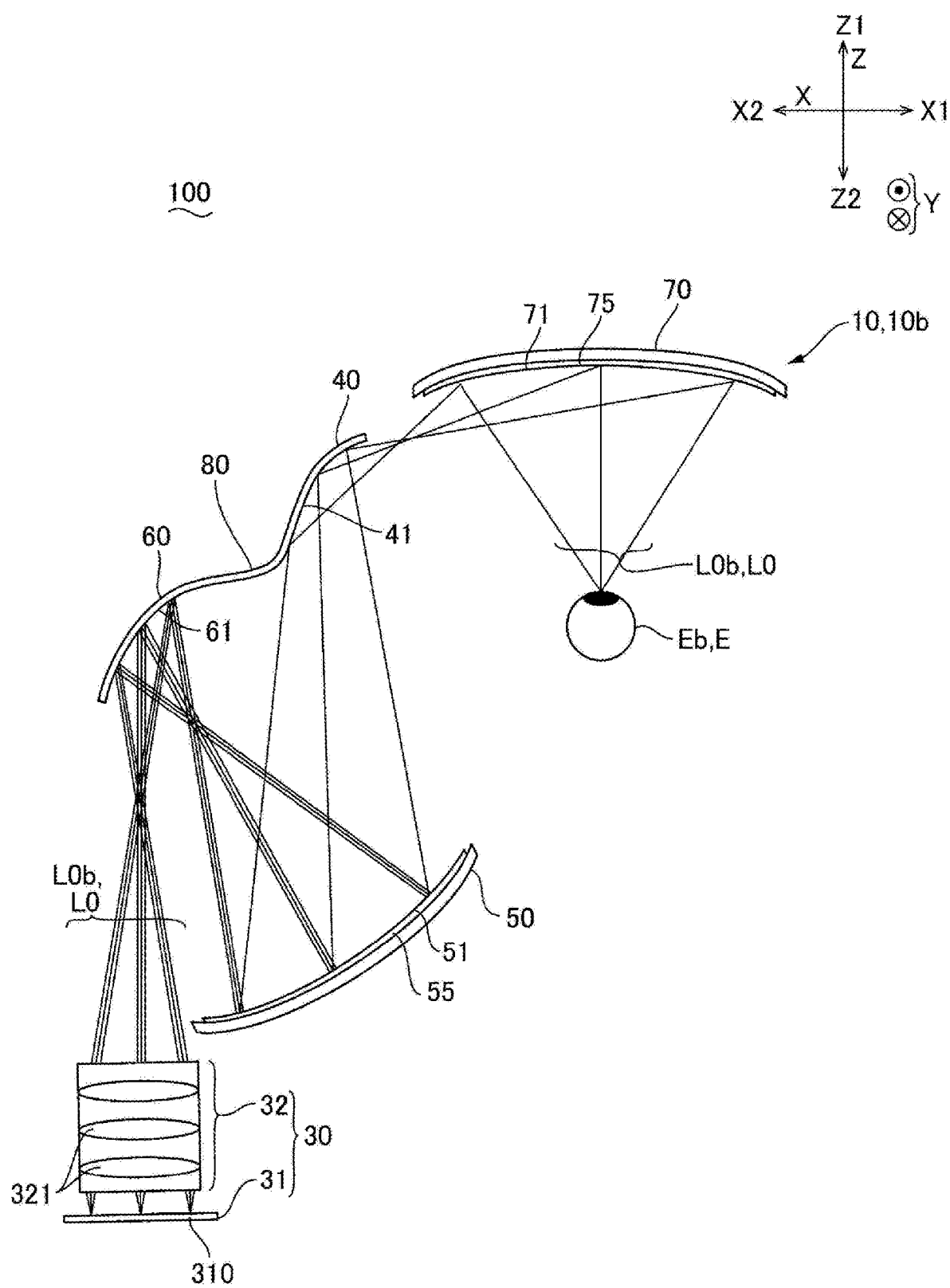
FIG. 10 is a schematic diagram illustrating one aspect of an optical system of a display device according to Exemplary Embodiment 2 of the disclosure.

FIG. 10 is a schematic diagram illustrating one aspect of an optical system 10 of a display device 100 according to Exemplary Embodiment 2 of the disclosure. Note that the basic configuration of Exemplary Embodiment 2 described later is similar to the basic configuration of Exemplary Embodiment 1. Thus, common portions are illustrated with the same reference numerals, and detailed description of the common portions will be omitted.

As illustrated in FIG. 10, also in the optical system 10 of the display device 100 in Exemplary Embodiment 2, the second reflection element 60, the first diffraction element 50, the first reflection element 40, and the second diffraction element 70 are disposed along a traveling direction of the image light L0 emitted from the image light projecting device 30, similarly to Exemplary Embodiment 1. The first reflection element 40 and the second reflection element 60 are separate members in Exemplary Embodiment 1, but, as illustrated in FIG. 10, the first reflection element 40 and the second reflection element 60 are formed as an integral member 80 in Exemplary Embodiment 2. In Exemplary Embodiment 2, the first reflection element 40 and the second reflection element 60 are coupled to each other without an inflection point. According to the aspect, when the display device 100 is assembled, the first reflection element 40 and the second reflection element 60 can be handled as one part (member 80). Accordingly, the display device 100 can be efficiently assembled, and accuracy of positions of the first reflection element 40 and the second reflection element 60 can also be increased.

Exemplary Embodiment 3

In Exemplary Embodiments 1 and 2, at least the first reflection element 40 may have partial transmissivity. According to the configuration, when the first reflection element 40 is disposed diagonally in front of the eye E of the observer, an external view can be visually recognized via the first reflection element 40. Accordingly, even when the display device 100 is mounted on a head, a wide field of vision can be achieved.

Other Configuration Related to Wavelength Compensation in Optical System 10

Figure 11:
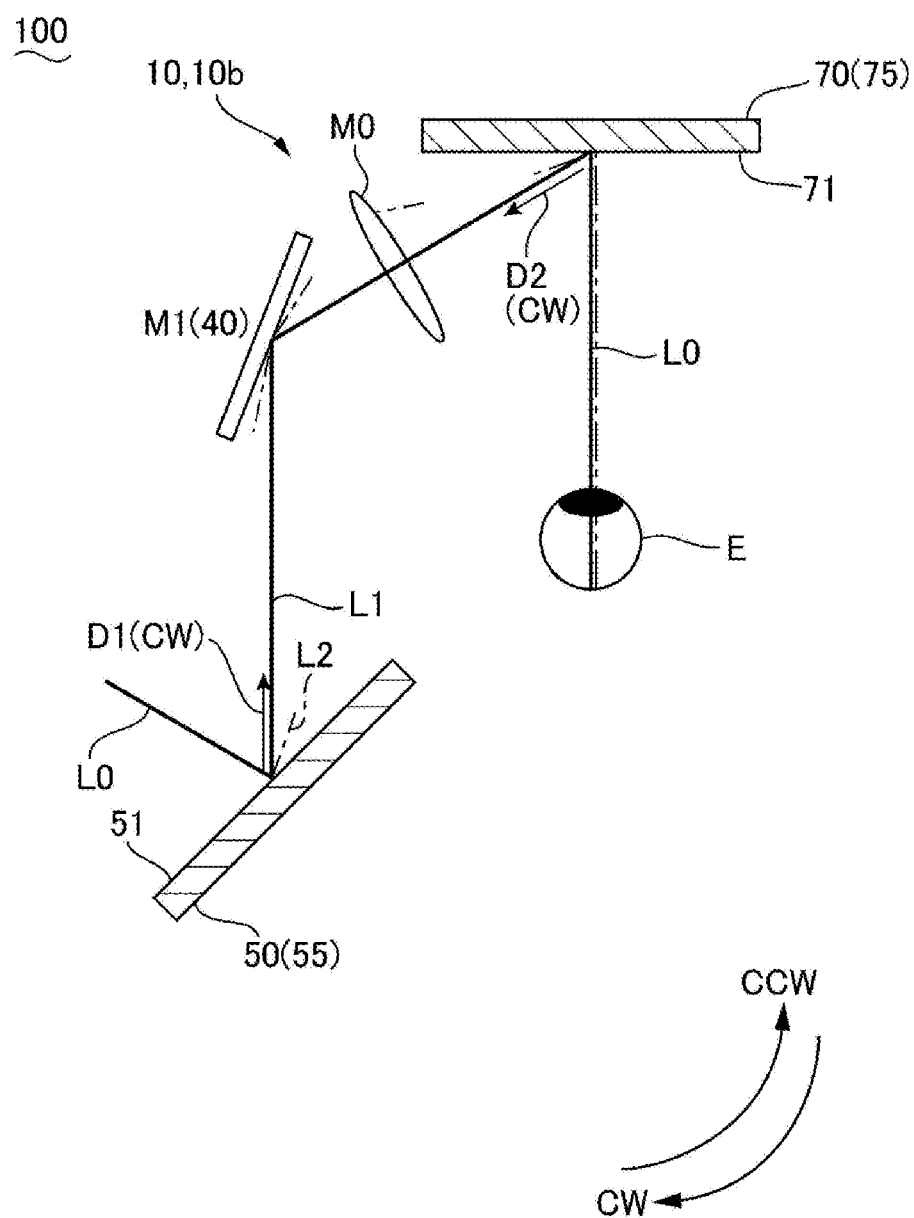
FIG. 11 is a schematic diagram of an optical path from the first diffraction element to the second diffraction element in the optical system illustrated in FIGS. 2 and 4.
Figure 12:
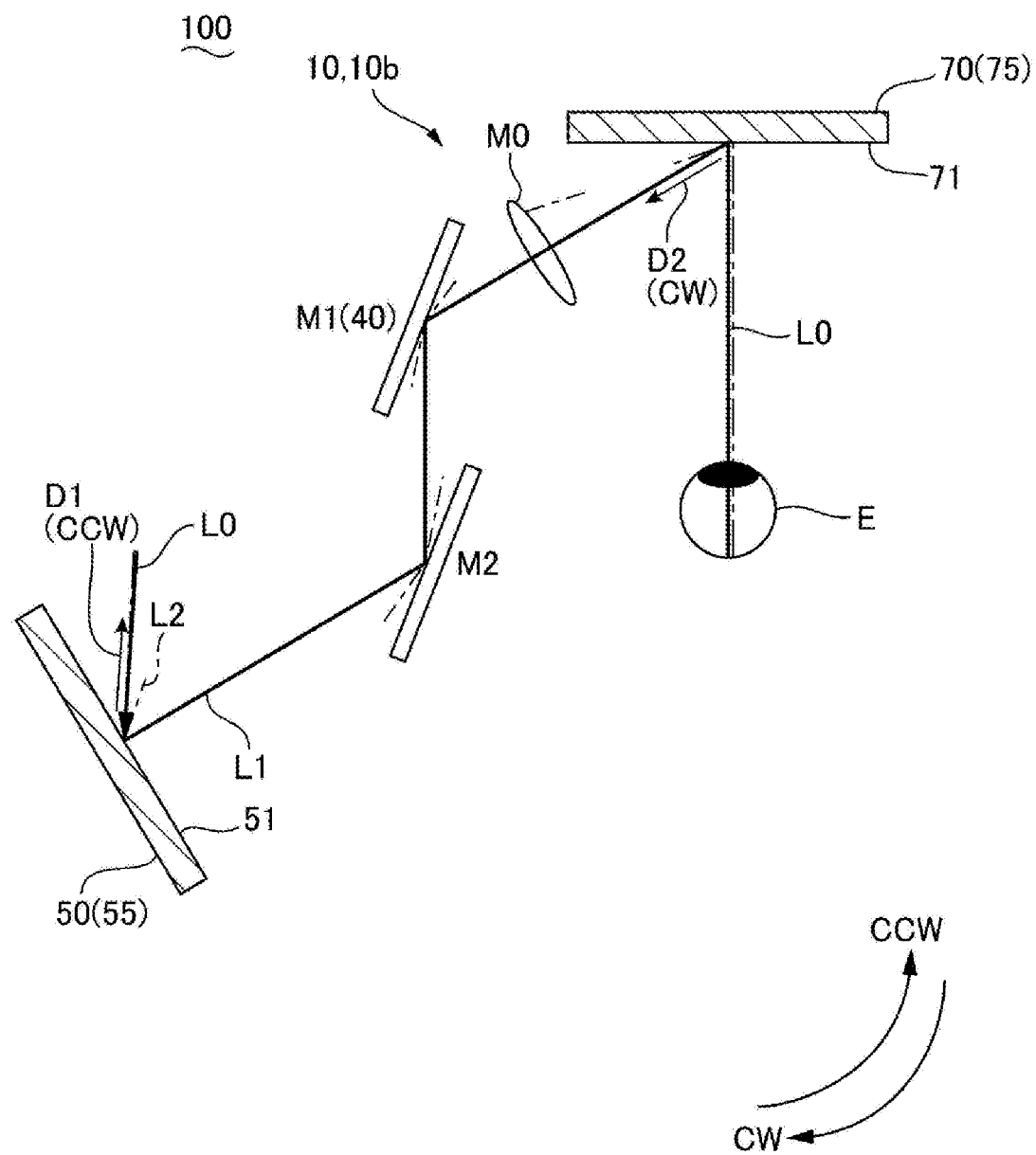
FIG. 12 is a schematic diagram of an optical path from the first diffraction element to the second diffraction element in the optical system according to a modified example of the disclosure.

With reference to FIGS. 11 and 12, some exemplary embodiments described above and a modified example of the disclosure will be described along with a description of a condition for wavelength compensation. FIG. 11 is a schematic diagram of the optical path from the first diffraction element 50 to the second diffraction element 70 in the optical system 10 illustrated in FIGS. 2 and 4. FIG. 12 is a schematic diagram of the optical path from the first diffraction element 50 to the second diffraction element 70 in the optical system 10 according to a modified example of the disclosure.

In FIGS. 11 and 12, planes represent the first diffraction element 50, the first reflection element 40, and the second diffraction element 70, and an intermediate image generating lens M0 represents generation of an intermediate image by the first reflection element 40 to facilitate the understanding of the configuration between the first diffraction element 50 and the second diffraction element 70. In FIG. 11, a mirror M1 represents the first reflection element 40. FIG. 12 illustrates a case where a mirror M2 is disposed between the first diffraction element 50 and the first reflection element 40 (mirror M1).

Note that FIGS. 11 and 12 illustrate the light L2 (dot-and-dash line) on the long wavelength side with respect to the specific wavelength. Also in FIGS. 11 and 12, a direction at which the diffraction efficiency is the greatest when light is incident from a normal direction of the incident surface 51 of the first diffraction element 50 is a first diffraction direction D1, and a direction at which the diffraction efficiency when light is incident from a normal direction of the incident surface 71 of the second diffraction element 70 is a second diffraction direction D2.

In the optical system 10 illustrated in FIG. 11, the second diffraction element 70 and the first diffraction element 50 are disposed such that the direction of the second diffraction direction D2 with respect to the normal direction of the incident surface 71 of the second diffraction element 70 is a CW direction while the direction of the first diffraction direction D1 with respect to the normal direction of the incident surface 51 of the first diffraction element 50 is also the CW direction.

In the optical system 10 illustrated in FIG. 12, the second diffraction element 70 and the first diffraction element 50 are disposed such that the direction of the second diffraction direction D2 with respect to the normal direction of the incident surface 71 of the second diffraction element 70 is the CW direction while the direction of the first diffraction direction D1 with respect to the normal direction of the incident surface 51 of the first diffraction element 50 is a CCW direction.

In other words, the first diffraction element 50 and the second diffraction element 70 are disposed differently depending on whether a sum of the number of reflections and the number of times of generating intermediate image between the first diffraction element 50 and the second diffraction element 70 is an even number or an odd number.

Specifically, when a sum of the number of reflections and the number of times of generating intermediate image is an even number as in the optical system 10 illustrated in FIG. 11, the first diffraction element 50 and the second diffraction element 70 are disposed such that the direction of the second diffraction direction D2 with respect to the normal direction of the incident surface 71 of the second diffraction element 70 and the direction of the first diffraction direction D1 with respect to the normal direction of the incident surface 51 of the first diffraction element 50 are the same direction (CW direction) seen from a normal direction (plan view direction of FIG. 11) of a virtual plane including a normal line of the incident surface 71 of the second diffraction element 70 and a normal line of the incident surface 51 of the first diffraction element 50.

In contrast, when a sum of the number of reflections and the number of times of generating intermediate image is an odd number as in the optical system 10 illustrated in FIG. 12, the second diffraction element 31 and the second diffraction element 70 are disposed such that the direction of the second diffraction direction D2 and the direction of the second diffraction direction D1 are opposite directions (CW direction and CCW direction) from each other seen from a normal direction (planar direction of FIG. 12) of the above-mentioned virtual plane.

In this way, the image light L0 having a spectral width is deflected and dispersed at each wavelength by the first diffraction element 50, and then condensed at each wavelength by the second diffraction element 70 and incident as substantially parallel light on a pupil of the observer.

Note that the modified example illustrated in FIG. 12 illustrates one aspect in which the mirror M2 is added between the second diffraction element 70 and the first diffraction element 50, but addition or deletion of an optical element is not limited to this aspect. Also in this case, the direction of the second diffraction direction D2 with respect to the normal direction of the incident surface 71 of the second diffraction element 70 and the direction of the first diffraction direction D1 with respect to the normal direction of the incident surface 51 of the first diffraction element 50 may be arranged in the same manner as the above-mentioned example, depending on whether a sum of the number of reflections and the number of times of generating intermediate image between the first diffraction element 50 and the second diffraction element 70 is an even number or an odd number.

Other Exemplary Embodiment

In some exemplary embodiments described above, the second reflection element 60 forms an intermediate image between the second reflection element 60 and the first diffraction element 50, but an aspect may be adopted in which, for example, the second reflection element 60 has a plane reflection surface, and an intermediate image is not formed between the second reflection element 60 and the first diffraction element 50. Further, an aspect may be adopted in which an intermediate image is formed between the image light projecting device 30 and the second reflection element 60. The disclosure may be applied to the display device 100 without the second reflection element 60.

In some exemplary embodiments described above, since the image light projecting device 30, the second reflection element 60, and the first diffraction element 50 are disposed in a temporal region of the observer, the first reflection element 40 emits the image light L0 in the right-and-left direction (second direction X) and causes the image light L0 to be incident on the second diffraction element 70. However, an aspect may be adopted in which the image light projecting device 30, the second reflection element 60, and the first diffraction element 50 are disposed in a parietal region of the observer, and the first reflection element 40 emits the image light L0 in the vertical direction (third direction Y) and causes the image light L0 to be incident on the second diffraction element 70.

What is claimed is:
1. A display device comprising:
a first diffraction element on which image light emitted from an image light projecting device is incident;
a first reflection element on which the image light emitted from the first diffraction element is incident;
a second reflection element in an optical path from the image light projecting device to the first diffraction element; and
a second diffraction element configured to emit the image light emitted from the first reflection element toward an eye of an observer, wherein
the first diffraction element, the first reflection element, and the second diffraction element are disposed along a traveling direction of the image light emitted from the image light projecting device,
a reflection surface of the first reflection element is a concave surface with a central portion being recessed with respect to a peripheral portion,
a first intermediate image is formed between the first reflection element and the second diffraction element,
the second reflection element is configured to emit the image light emitted from the image light projecting device toward the first diffraction element,
a reflection surface of the second reflection element is a concave surface with a central portion being recessed with respect to a peripheral portion, and
a second intermediate image is formed between the second reflection element and the first diffraction element.
2. The display device according to claim 1, wherein the reflection surface of the first reflection element is a free-curved surface.
3. The display device according to claim 1, wherein the first diffraction element and the second diffraction element are each reflection-type.
4. The display device according to claim 3, wherein the first diffraction element and the second diffraction element are each reflection-type volume holographic elements.
5. The display device according to claim 3, wherein an incident surface of the first diffraction element and an incident surface of the second diffraction element are each concave surfaces with central portions being recessed with respect to peripheral portions.
6. The display device according to claim 1, wherein the first reflection element has partial transmissivity.
7. The display device according to claim 1, wherein the reflection surface of the second reflection element is a free-curved surface.
8. The display device according to claim 1, wherein the first reflection element and the second reflection element are formed integrally.
9. The display device according to claim 1, further comprising:
a frame that holds the image light projecting device, the second reflection element, the first diffraction element, the first reflection element, and the second diffraction element, wherein
when the frame is mounted on a head of the observer, the second diffraction element is disposed in front of the eye of the observer.
10. The display device according to claim 9, wherein the image light projecting device emits the image light forward, the second reflection element emits the image light rearward,
the first diffraction element emits the image light forward,
the first reflection element emits the image light in a right-and-left direction or downward, and
the second diffraction element emits the image light rearward.

11. A display device comprising:
a first diffraction element on which image light emitted from an image light projecting device is incident;
a first reflection element on which the image light emitted from the first diffraction element is incident;
a second reflection element in an optical path from the image light projecting device to the first diffraction element; and
a second diffraction element configured to emit the image light emitted from the first reflection element toward an eye of an observer, wherein
the first diffraction element, the first reflection element, and the second diffraction element are disposed along a traveling direction of the image light emitted from the image light projecting device,
a reflection surface of the first reflection element is a concave surface with a central portion being recessed with respect to a peripheral portion,
a first intermediate image is formed between the first reflection element and the second diffraction element,
the second reflection element is configured to emit the image light emitted from the image light projecting device toward the first diffraction element, and
the first reflection element and the second reflection element are formed integrally.

* * * * *